US010934865B2

(12) United States Patent
Kush

(10) Patent No.: US 10,934,865 B2
(45) Date of Patent: *Mar. 2, 2021

(54) COOLED SINGLE WALLED BLISK FOR GAS TURBINE ENGINE

(71) Applicant: Rolls-Royce Corporation, Indianapolis, IN (US)

(72) Inventor: Matthew T. Kush, Martinsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1126 days.

This patent is subject to a terminal disclaimer.

(21) Appl. No.: 15/405,508

(22) Filed: Jan. 13, 2017

(65) Prior Publication Data
US 2018/0230833 A1    Aug. 16, 2018

(51) Int. Cl.
*F01D 5/34* (2006.01)
*F01D 5/18* (2006.01)

(52) U.S. Cl.
CPC .............. *F01D 5/34* (2013.01); *F01D 5/186* (2013.01); *F05D 2220/32* (2013.01); *F05D 2230/211* (2013.01); *F05D 2230/31* (2013.01); *F05D 2260/202* (2013.01); *Y02T 50/676* (2013.01)

(58) Field of Classification Search
CPC ..... F01D 5/08; F01D 5/18; F01D 5/34; F01D 5/186; F05D 2220/32; F05D 2230/53; F05D 2230/31; F05D 2230/211; F05D 2260/202; Y02T 50/676
USPC ........................................................ 416/96 R
See application file for complete search history.

(56) References Cited

U.S. PATENT DOCUMENTS

| 5,165,852 | A | * | 11/1992 | Lee | .......................... | F01D 5/187 416/95 |
| 5,244,345 | A | | 9/1993 | Curtis | | |
| 5,259,730 | A | * | 11/1993 | Damlis | .................... | B23P 15/04 416/96 A |
| 5,738,493 | A | * | 4/1998 | Lee | .......................... | F01D 5/187 416/97 R |
| 5,797,726 | A | * | 8/1998 | Lee | .......................... | F01D 5/187 416/96 R |
| 5,876,182 | A | | 3/1999 | Schulte | | |
| 6,022,190 | A | | 2/2000 | Schillinger | | |
| 6,213,714 | B1 | | 4/2001 | Rhodes | | |
| 6,837,687 | B2 | * | 1/2005 | Lee | .......................... | F01D 5/18 416/224 |

(Continued)

FOREIGN PATENT DOCUMENTS

DE        103 61 882 B4    7/2005
WO    WO 2011/054342 A1    5/2011

*Primary Examiner* — Patrick Hamo
*Assistant Examiner* — Chirag Jariwala
(74) *Attorney, Agent, or Firm* — Brinks Gilson & Lione

(57) ABSTRACT

A gas turbine engine and a blisk are disclosed, including methods of making the same. The blisk may include a disk, spars of airfoils, platforms, and shanks of the airfoils integrally formed as a unit. Such blisk features may be integrally formed by a casting process or additive manufacturing. The blisk includes cooled airfoils, such that the spar includes standoffs, and a cover panel is bonded to an outer surface of the standoffs to define passages between the cover panel and the spar. Cooling air is fed through an inlet port formed in a base standoff to the passages of the spar through a cooling feed channel defined in the disk or shank portion.

16 Claims, 6 Drawing Sheets

(56) References Cited

U.S. PATENT DOCUMENTS

| | | | |
|---|---|---|---|
| 6,923,616 B2* | 8/2005 | McRae, Jr. | F01D 5/187 |
| | | | 415/115 |
| 7,189,063 B2* | 3/2007 | Honkomp | F01D 5/081 |
| | | | 416/193 A |
| 7,322,396 B2* | 1/2008 | Govern | B23K 9/0026 |
| | | | 164/122.1 |
| 7,431,564 B2 | 10/2008 | Newman | |
| 8,109,724 B2* | 2/2012 | Malecki | F01D 5/189 |
| | | | 416/90 R |
| 8,556,576 B2 | 10/2013 | Wilson, Jr. et al. | |
| 8,992,168 B2 | 3/2015 | Norris et al. | |
| 9,249,669 B2* | 2/2016 | Garcia-Crespo | F01D 5/18 |
| 9,528,377 B2* | 12/2016 | Fedor | F01D 5/081 |
| 2006/0093484 A1 | 5/2006 | Liang | |
| 2007/0071608 A1 | 3/2007 | Trewiler et al. | |
| 2010/0284817 A1 | 11/2010 | Bamberg et al. | |
| 2010/0322767 A1 | 12/2010 | Nadvit et al. | |
| 2011/0255991 A1 | 10/2011 | Borufka et al. | |
| 2013/0039760 A1 | 2/2013 | Burt et al. | |
| 2016/0130957 A1 | 5/2016 | Freeman et al. | |
| 2016/0222806 A1 | 8/2016 | Jennings | |
| 2016/0222822 A1 | 8/2016 | Jennings | |
| 2016/0258320 A1 | 9/2016 | Thomas et al. | |
| 2018/0135424 A1* | 5/2018 | Barker | F01D 5/186 |
| 2018/0135426 A1* | 5/2018 | Barker | F01D 5/187 |
| 2018/0230832 A1* | 8/2018 | Dierksmeier | F01D 5/082 |

* cited by examiner

COOLED SINGLE WALLED BLISK FOR GAS TURBINE ENGINE

TECHNICAL FIELD

The present disclosure relates generally to gas turbine engines, and more specifically to bladed disks or blisks used in sections of gas turbine engines.

BACKGROUND

At least some known turbine engines include an air intake portion, a compressor portion, a combustion portion, a turbine portion, and an exhaust portion. Such known turbine engines produce thrust and/or extract energy from a fluid flow by first compressing the intake air within the compressor portion. The compressor portion may include a series of bladed disks to form a multi-stage, axial compressor. Fuel is added to the compressed air, and the mixture is combusted in the combustion portion. The resulting hot, high-pressure gas is then expanded through the turbine portion to extract energy therefrom. The turbine portion may include a series of bladed disk assemblies (or blisks) to form a multi-stage turbine. Turbine blisks include a series of turbine blades arranged circumferentially about a rotor or disk. Blades may be secured to the rotor by the root of the blade. Current turbine blisks have been expensive to assemble due to the number of components and tight tolerances. In addition, turbine blisks without suitable heat management strategies may have shorter lifecycles and limit the efficiency and power of the turbine engine. Thus, a need exists for an improved turbine blisks, and methods for manufacturing the same.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Disclosed herein are examples of blisks that may be used in different sections, such as, compressor and/or turbine sections, of gas turbine engines for any industry, such as, for example, to power aircraft, watercraft, power generators, and the like. The blades of the blisks may be configured to receive cooling air. Cooled blades, for example, cooled turbine blades, advantageously may extend the life of the blades beyond single service life cycles. Cooled blades may allow the turbine engine to run hotter and more powerful as the blades are configured to withstand hotter gas temperature environments. Cooled blades may allow the turbine engine to run more efficiently because less air from the compressor may be required for cooling and, instead, be used for work such as combustion. The blade configurations may include a single wall or dual wall configuration, having a spar and a panel cover sheet bonded to standoffs of the spar. The blisks may be fully casted as an integral, single unit component, for example, using a casting process or by additive manufacturing. Alternatively, a bladed annular structure, which may be casted or made from additive manufacturing as an integral, single unit component, may be metallurgically bonded to a rotor disk to form the blisk. The integrated blisk structures may be less expensive to manufacture, when considering the attachment costs and weight costs of attaching the blades to the disk individually with a dovetail or fir tree attachment configuration.

Figure 1:
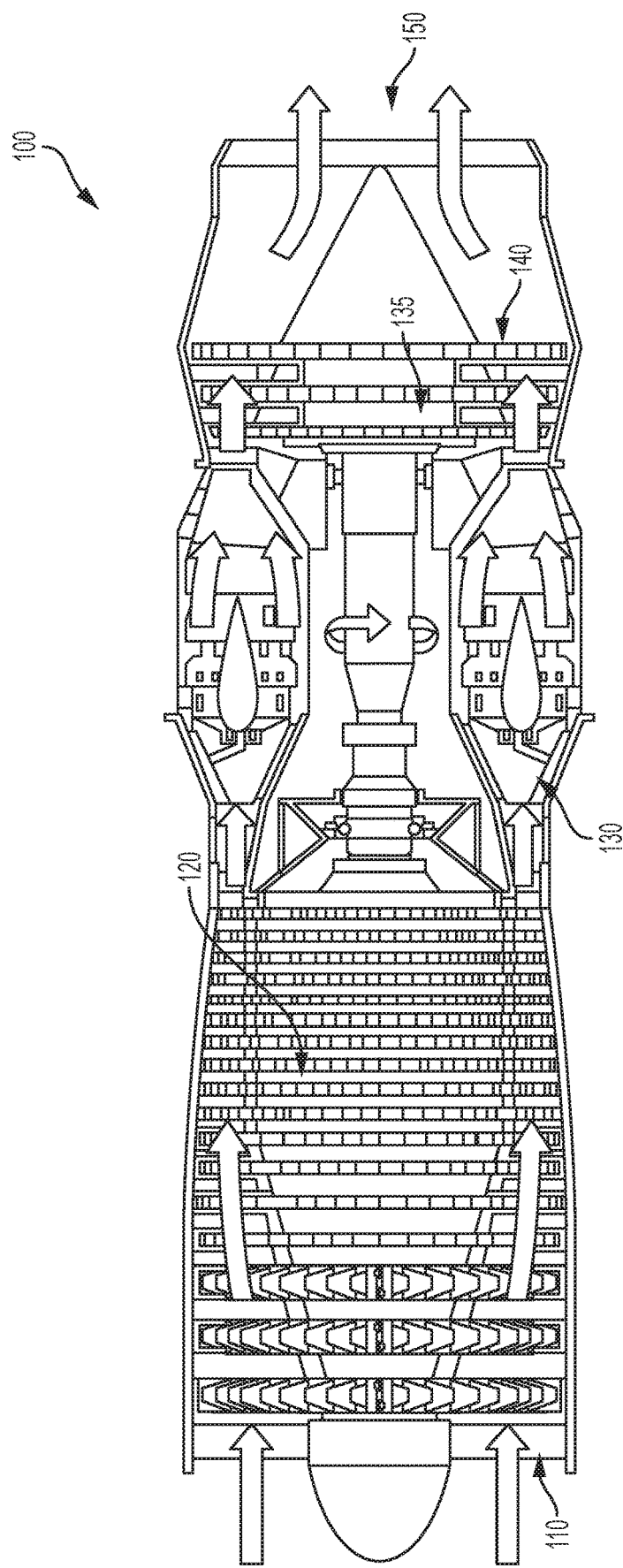
FIG. 1 depicts an example of a gas turbine engine including an example of a blisk.

FIG. 1 is a cross-sectional view of one example of a turbine engine 100. The engine 100 may include one or more of the following: an air intake portion 110, a compressor portion 120, a combustion portion 130, a turbine portion 135, and an exhaust portion 150 disposed along a longitudinal axis CL. The engine 100 may be used in any suitable application, such as, for example, to produce thrust in aircraft applications, to drive a propeller in aquatic applications, or to drive a generator in energy applications. In use, air received from the intake portion 110 may be compressed within the compressor portion 120. The compressor portion 120 includes a series of bladed disks to form a multi-stage, axial compressor. The compressed air may be then mixed with fuel and the mixture may be burned in combustion portion 130. The combustion portion 130 may include any suitable fuel injection and combustion mechanisms. The hot, high-pressure gas may be then passed through the turbine portion 135 to extract energy from the gas, which in turn drives the compressor portion 120 while discharging thrust out the exhaust portion 150.

As shown, the turbine portion 135 may include a series of turbine blisks (or bladed disk assemblies) 140. In this manner, the blisks 140 may form a multi-stage turbine. In use, the gas temperatures within the turbine portion 135 may reach temperatures at or above 2000° F., 2400° F., or higher. Moreover, certain components within the turbine portion 135, such as the flow path portion of the blisks 140 may reach temperatures of between 1600 and 1900° F., and higher, due to the heat transferred from the hot gas. To accommodate these temperatures, in some embodiments, the blisks 140 may include blades that include internal cooling flow passages, as will be described.

Figure 3:
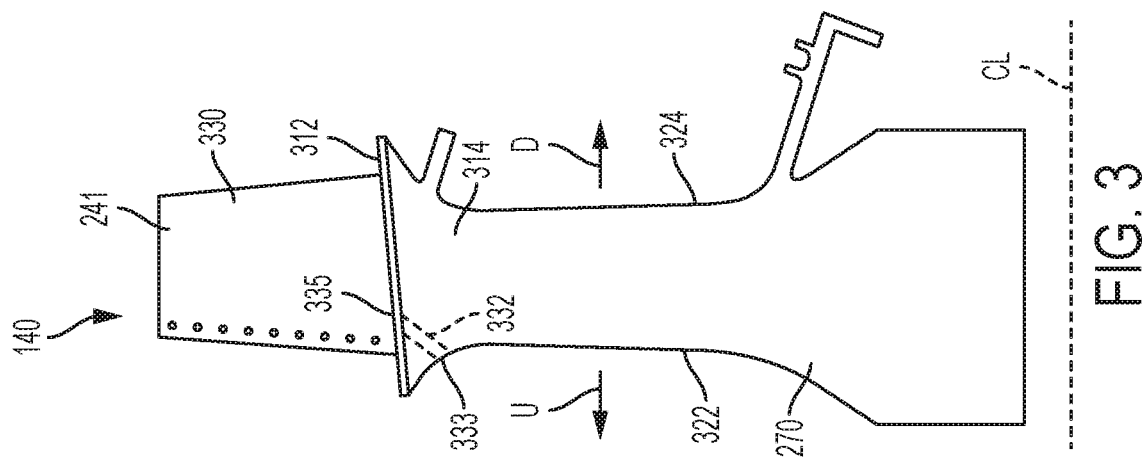
FIG. 3 is sectional view of the blisk taken along lines 3-3 in FIG. 2.
Figure 2:
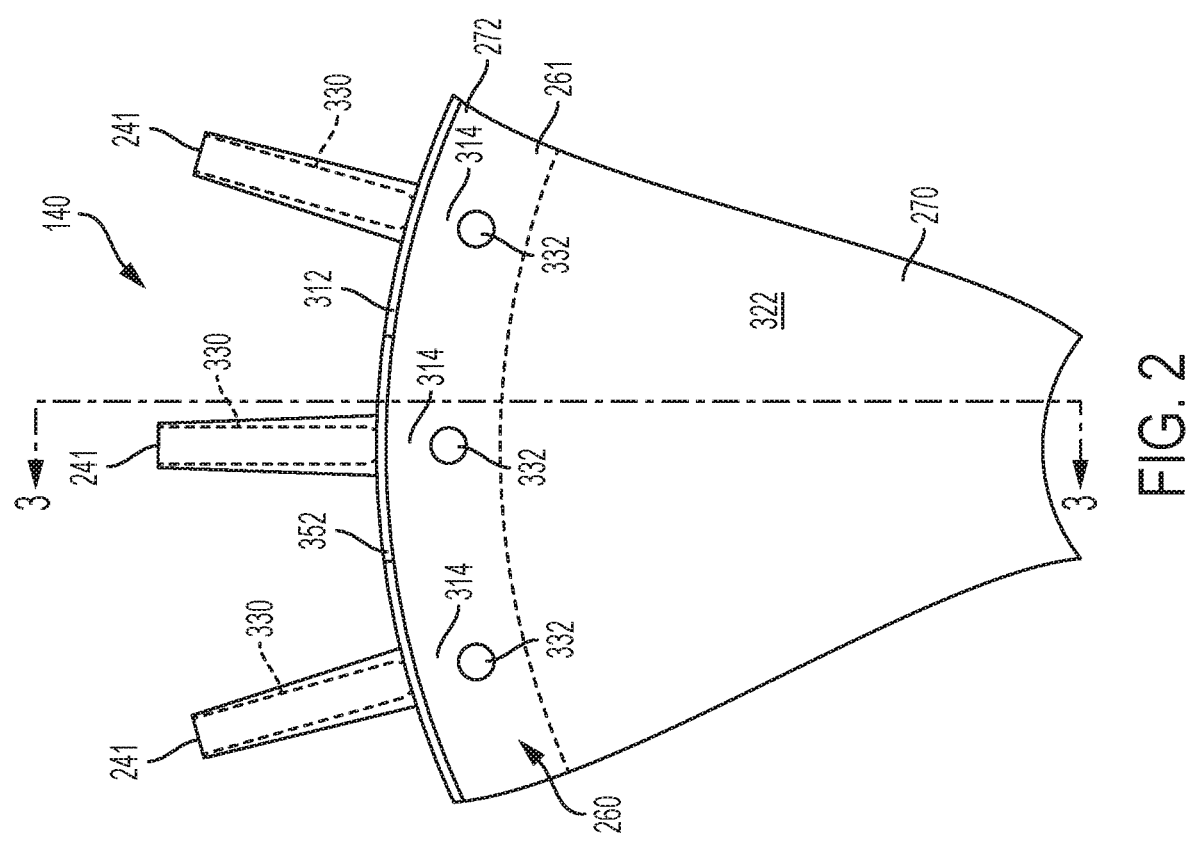
FIG. 2 is an axial downstream view of a partial segment of an example of a blisk including a disk and blade sections fully integrated into a single unit.

FIG. 2 illustrates a circumferential segment of the blisk 140 included within the engine 100 or any other suitable turbomachinery. FIG. 3 depicts a sectional view of the blisk 140 taken along lines 3-3 in FIG. 2. The blisk 140 may include one or more of the following: a plurality of blades 241 forming a blade annular element 260 and a rotor disk 270, which is in a coaxial relationship with the blade annular element 260. The blade annular element 260 may include a ring element 261 radially inward from the blades. In one example, the blade annular element 260 and the disk 270 are an integrated unit. The blade annular assembly 260 is shown including an outer surface 272 that may be a continuous, circumferential surface. The blades 241 may be spaced circumferentially around the blade annular assembly 260 and the disk 270 and extend radially outward from the longitudinal axis CL of the engine 100. The number of blades 241 may depend on the application of the blisk 140, for example, whether the blisk 140 is a high pressure, intermediate pressure, or low pressure stage, and what type of engine the blisk 140 belongs to.

The blades 241 may include an airfoil 310 extending radially outward from a platform 312 relative to the longitudinal axis CL, and a shank portion 314 extending below the platform. The shank portion 314 may radially extend between the platform 312 and the disk 270. A cooling feed channel 332 is defined in a first face 322 of the blisk 140 along the shank portions 314 of blades 241. The first face 322 may be referred to as the upstream or high pressure side of the blisk 140 and may also be used to reference the upstream side of the disk. A second face 324 obverse to the first face 322 may be referred to as the downstream or low pressure side of the blisk 140 and may also be used to reference the downstream side of the disk. To this end, the arrow U pointing away from the first face 322 is pointed in an upstream direction, and the arrow D pointing away from the second face 324 is pointed in a downstream direction. The cooling feed channel 332 includes an upstream, inlet end 333 and a downstream, outlet end 335. As shown, a plurality of inlet ends 333 of the cooling feed channels 332 is disposed in an annular pattern along the blisk 140. As will be described, the cooling feed channels 332 are configured to receive cooling air flow from the compressor section for cooling of the shank portion, the platform, and the airfoil.

The airfoil 310 may include an internal cooling flow passage 330 (shown in dashed lines) defined therein. As will be described, the internal cooling flow passages 330 may include internal spar cavities or plenum, impingement ports, spar surface cooling passageways, and/or discharge ports. The cooling feed channel 332 (also shown in dashed lines) may be defined within the shank portion 314 or disk 270. For example, the cooling feed channel 332 may extend between, and in fluid communication with, the internal cooling flow passage 330. Here, the downstream, outlet end 335 may terminate at the inlet of the internal cooling flow passage 330, as will be described. The cooling feed channel 332 may have a curvature including a circumferential portion shown extending within the shank portion 314 from the upstream end 333, and a radial portion shown extending to the downstream end 335. Alternatively, more than one upstream end 333 and cooling feed channels may be included to provide more than one inlet into the internal cooling flow passage 330. The cross-sectional shape of the upstream end 333 of the cooling feed channel 332 may be round or elliptical or otherwise shaped to reduce flow losses.

The airfoil 310 may include a spar with surface passageways defined therein forming an aspect of the internal cooling flow passage 330. The airfoil 310 may include a spar with external standoffs and/or protrusions formed in the outer surface of the spar, and a cover panel attached to the spar such that the spacings between the standoffs and/or protrusions define aspects of the internal cooling flow passage 330 to define a blade with single wall spar configuration. Cooling air provided in the spacings provide cooling of the spar and the cover panel and a series of discharge or outlet ports may be defined by the cover panel to allow cooling air to leave the spacings for film cooling of the airfoil outer surface. A shell or cover panel(s) is metallurgically bonded to an outer surface of the standoffs of the spar. The standoffs may be elongated structures to form grooves or channels and/or pedestals or pins to define other aspects of the internal cooling flow passage 330. The grooves or channels forming aspects of the internal cooling flow passages may have various configurations, for example, a serpentine, or 's', shape, with a series of radial passages, joined by bends, directing the internal blade cooling flow alternately radially inwardly and radially outwardly.

The platforms 312 may be discontinuous or having a slot 352 formed in an intermediate region between adjacent blades 241. The platforms 312 with slots 352 may allow for thermal expansion and contraction to occur in order to avoid thermal stresses that lead to potential cracking in the platforms. The dimensions of the platforms 312 in the circumferential direction may be sufficient that adjacent platform edges abut one another. In some examples, the platform edges in the abutment relationship may be joined permanently such as by welding or brazing.

One or more seal supports and/or seal elements extending from the platform and/or the disk may be included. For example, the seal elements may extend longitudinally downstream and/or upstream from the platform and/or from the disk 270 beyond the shank portion 314. The seal element may include knife edge seals or other sealing mechanisms. For example, the knife edge seals may sealably engage with a vane seal assembly (not shown) of a downstream and/or upstream vane structure (not shown). In one example, the vane seal assembly may be an annular honeycomb structure into which the knife edge seals engage. The annular honeycomb structure may provide an indirect air seal path as well as an abradable interface surface within which the knife edge seals sealably engage. In one example, the sealed arrangement provided between the seal elements and the vane seal assemblies may further inhibit leakage of the hot gas from mixing with the cooling air or the loss of cooling air to the hot gas path, making the disk and internal blades susceptible undesirably to hotter temperatures. Accordingly, the sealed arrangement is operable to allow for the effective passage of cooling air across the face of the disk and internal to the blade for convection cooling, thereby reducing its operating temperature. Other extensions or rims may be included extending longitudinally downstream and/or upstream from the platform 312, the shank portion 314, and/or the disk beyond the shank portion 314 and the airfoil to form of circumferential rim, which may be a continuous rim without any breaks or a discontinuous rim with one or more breaks. The extensions or rims may form a complete annulus shielding the disk from the temperature of the main gas path and directing the hot gas downstream for exhaust. The adjacent vane structures may include a lip for overlapping the inner surface of such rims. Seal elements, such as the honeycomb seal and knife edge seal arrangement, may be included for sealing this region.

Figure 4:
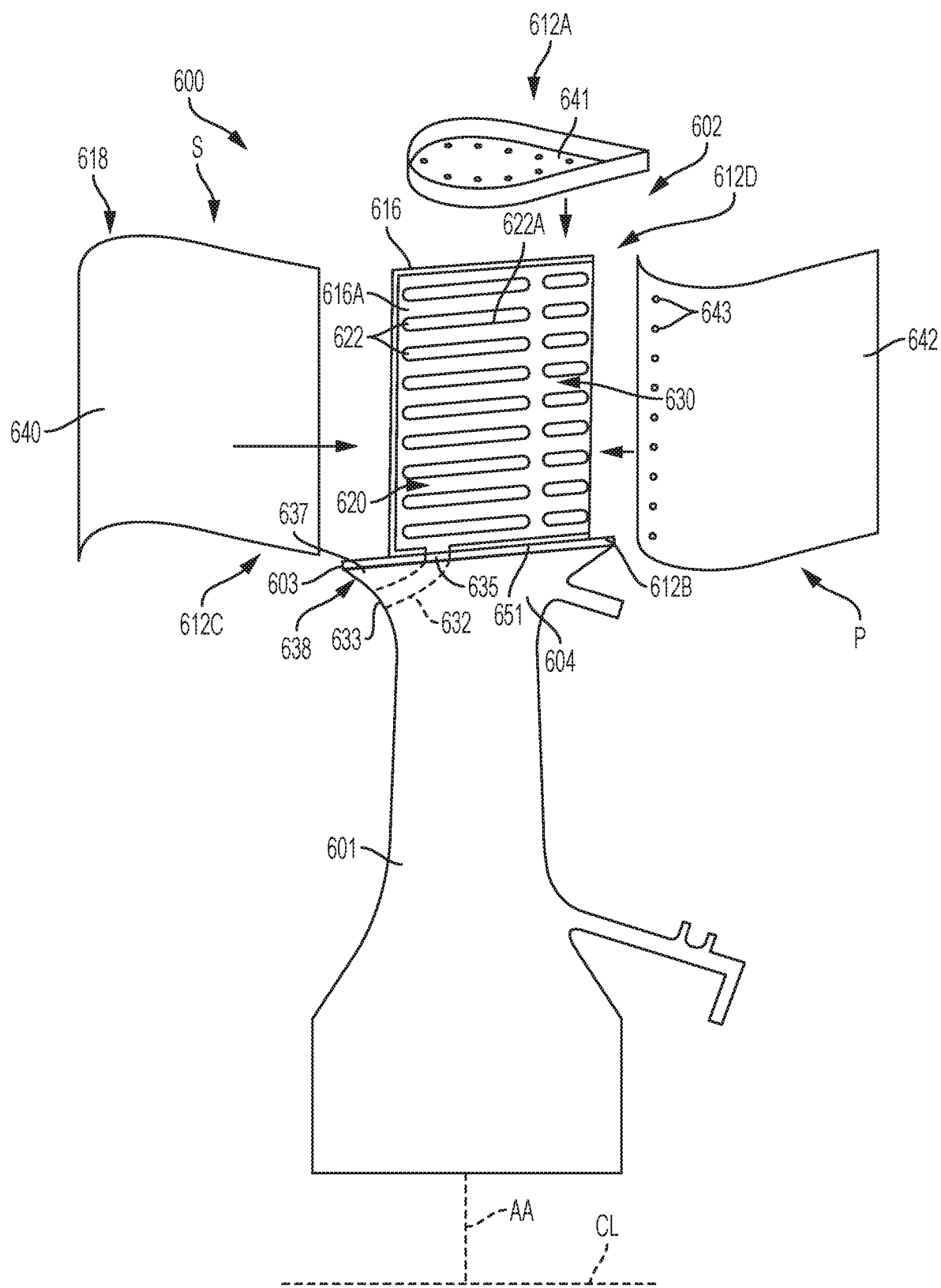
FIG. 4 is a side view of an example of a blisk including a disk and spar sections fully integrated into a single unit, and cover panels separated from the spar.

FIG. 4 illustrates an example of the blisk having one or more of the features of the blisk 140, which is now referred to as blisk 600, having the disk 601 and one or more aspects of the blade 602, shown now as a cooled single wall blade, formed integrally as a single unit. For example, a spar 616, the platform 603, and the shank portion 604 may be integrally formed with the disk 601 as a single unit. The spar 616 is disposed along an airfoil axis AA and an external cover panel 618 is coupled to the spar 616, such as metallurgically bonded to the spar 616 or spar features as described below. Airfoil axis AA extends radially perpendicular to the longitudinal axis CL of the engine. The outer surface 616A of the spar 616 may include a plurality of passages or grooves 620 formed therein to define a plurality of cooling flow passages 630 along the spar surface disposed between the spar 616 and the cover panel 618. The cooling feed channel 632 is shown extending from the upstream side of the disk to the inlet of the cooling flow passages 630, which coincides with the downstream end 635 of the cooling feed channel 632. In particular, the blisk includes an upstream rim 637. The upstream rim 637 may form a complete annulus shielding the disk 601 from the temperature of the main gas path above the rim and platform and for directing the hot gas downstream for exhaust. The upstream rim 637 is shown extending upstream beyond the leading edge of the spar 616. The thickness of the upstream rim 637 in the downstream direction may be tapered or become increasingly larger. The downstream face 638 of the upstream rim 637 may have a curvature until the disk transitions to disk face that is parallel to the airfoil axis AA. In one example, the cooling feed channel 632 may be positioned to extend within the upstream rim 637.

The grooves 620 are spaced along the spar 616 with standoffs 622 separating the grooves 620. The standoffs 622 protrude outwardly relative to the outer surface 616A of the spar 616 that defines an aspect of the grooves 620. FIG. 4 shows a pattern of grooves 620 in an elongation column row configuration extending between a leading edge 612C and a trailing edge 612D and disposed radially spaced from another relative to the longitudinal axis CL and along the airfoil axis AA. The grooves 620 may have other configurations such as portions running in the direction of a tip 612A and/or a base 612B. The standoffs 622 are shown having elongated shape to define longitudinal channels. The standoffs 622 may have other configurations than illustrated in the figures. For example, to achieve desirable cooling the pattern of standoffs 622 may comprise a plurality of pedestals, elongate columns, or pins or combination of variously sized elongated members and/or pedestals, columns, or pins. The pedestals, columns or pins may have various cross-sectional shapes, including rectangular, diamond, circular or semi-circular, as well as other shapes.

The cover panel 618 is coupled to an outer surface 622A of the standoffs 622 with respect to the spar 616 and spaced from the outer surfaces 616A lining the grooves 620, thereby forming the cooling flow passages 630. A flow of cooling air passing through one cooling flow passage 630 may be separated from a flow of cooling air passing through an adjacent cooling flow passage 630 by the standoffs 622. The cooling flow passages 630 may be sized to define microchannels or passages. For example, a width of the grooves 620 is defined between adjacent standoffs 622, and may be, for example, about 0.02 inches, 0.05 inches, or any size therebetween. Similarly, a height of the grooves 620 or depth of the cooling flow passages 630 is defined between the spar 616 and the cover panel 618, and may be, for example, about 0.015 inches, 0.035 inches, or any size therebetween. In one example, the plurality of grooves 620 may include a plurality of body section grooves and/or a plurality of tail section grooves separated by an internal standoff wall. As may be appreciated by one of ordinary skill in the art, the grooves 620 may be formed in the suction side S of the spar 616, as shown in FIG. 4, the pressure side P of the spar 616, or a combination of both.

Figure 5:
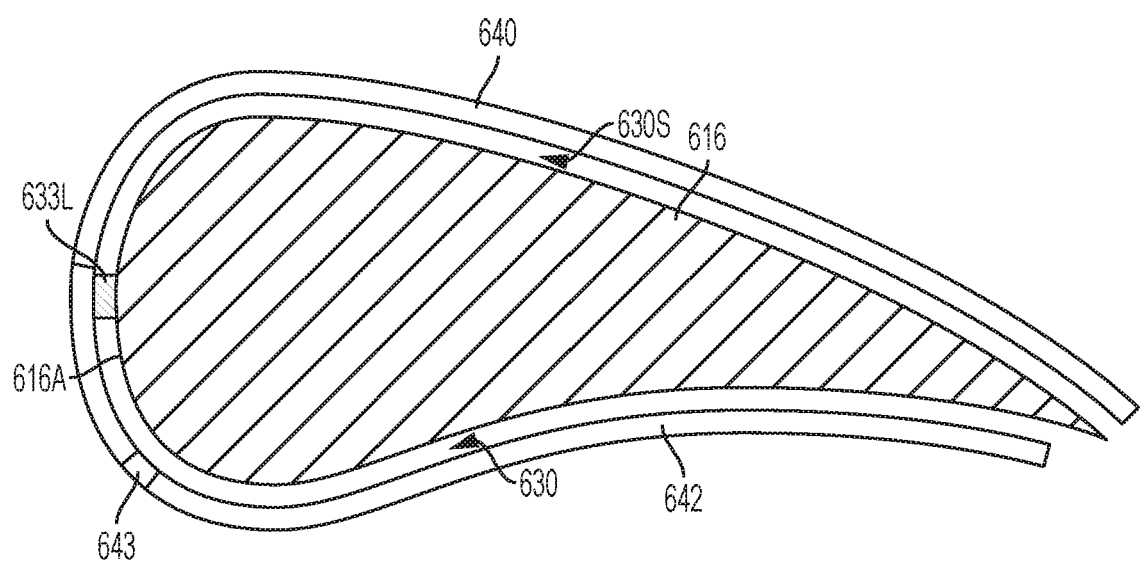
FIG. 5 is a cross-sectional view of an example single wall blade configuration for a blisk.

The cover panel 618 may include a single sheet that is formed and shaped of the final shape of the airfoil. In another example, as shown, the cover panel 618 may include a suction-side panel 640 and a pressure-side panel 642. Optionally, a tip plate 641 may be disposed over the tip section of the spar and coupled metallurgically to the suction side and pressure side panels. In FIG. 5, the suction-side panel 640 may be coupled to the outer surface of the suction-side standoffs of the suction side S of the spar 616 to at least partially cover the suction-side grooves and define the suction side cooling flow passages 630S. Similarly, as shown, the pressure-side panel 642 may be coupled to the outer surface 622A of the pressure-side standoffs 622 at the pressure side P of the spar 616 and is shown coupled to a leading edge radial separator wall 633L. The leading edge radial separator wall 633L may be formed along the leading edge 612C between the tip and the base and extended out away from the spar outer surface 616A by the same distance at the standoffs to separate the cooling air between the pressure side and the suction side. The single sheet cover panel or the panels 640, 642 may be a thin walled member, having a wall thickness in the range, such as, for example, about 0.015 inches to 0.025 inches. The cover panel 618 may include discharge ports 643 formed therein at the leading edge 612C, the trailing edge 612D, an intermediate section between the leading and trailing edges, the tip 612A, or any combination thereof.

Figure 6:
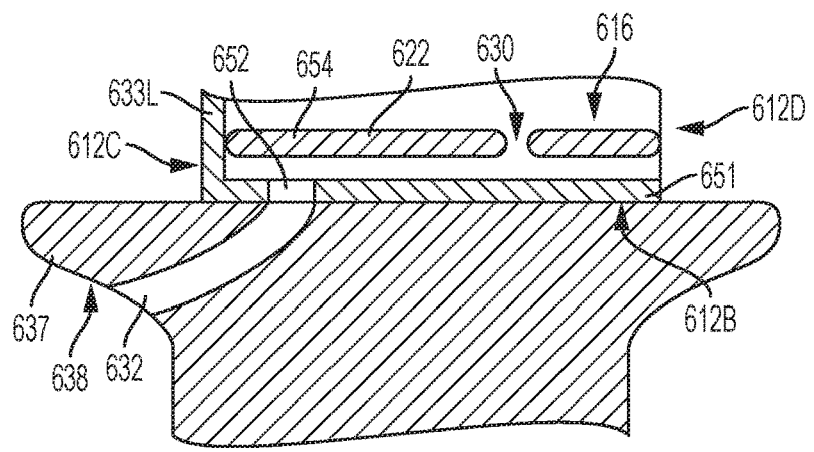
FIG. 6 is a sectional view along the airfoil axis of an example of a partial blisk.

With additional reference to FIG. 6, the standoffs 622 may include a base standoff 651 along the pressure side, as shown, and/or a second base standoff along the suction side (not shown). In one example, the base standoff 651 extends along the base end 612B of the spar 616 between the leading edge 612C and the trailing edge 612D. The leading edge radial separator wall 633L may be interconnected with one or each of the base standoffs 651. The base standoff 651 may include one or more gaps to define a corresponding number of inlet ports (one inlet port 652 shown) for entry to the cooling flow passages 630. A guide standoff 654 may be disposed adjacent to and axially disposed away from the base standoff 651 in the tip direction from the base standoff to define a surface base plenum 656 for distributing the cooling air flow to strategic thermal load locations. In one example, the guide standoff 654 may extend from the leading edge radial separator wall 633L and to an intermediate location 658 between the leading edge and the trailing edge to aid in guiding the cooling air toward the middle for better distribution to the spar center and trailing edge.

Figure 7:
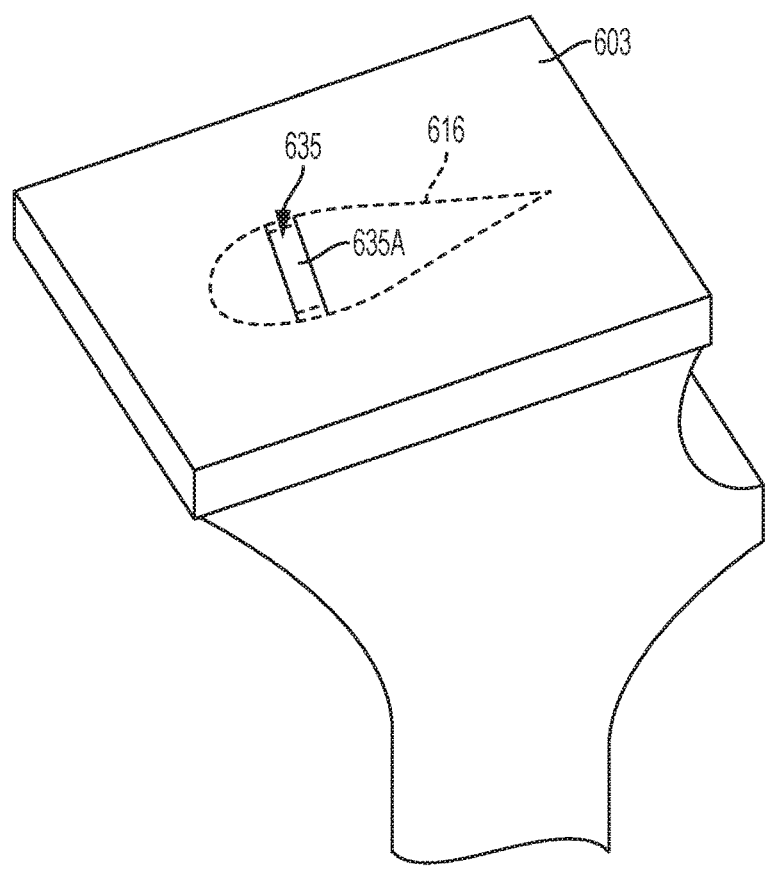
FIG. 7 depicts a relative location of a downstream end of a cooling feed channels formed in the blisk in FIG. 6.

FIG. 7 depicts the downstream end 635 of the cooling feed channel 632 relative to the spar 616 (shown in dashed lines) and the platform 603. The downstream end 635 may be sized to span the width of a chordwise cross-section of the spar 616 from the suction side to the pressure side, as shown in FIG. 7, in order to communicate to inlet ports 652 associated with both pressure and suction sides, when employed. The suction side inlet port may be similarly situated as the inlet port 652 associated with the pressure side. The ends of the downstream end 635 may communicate cooling air to the cooling air passages 630 via the inlet ports 652. An intermediate portion 635A of the downstream end 635 may provide cooling against the base of the spar. The intermediate portion 635A may be further configured cool a larger area of the spar base. In another example, the downstream end 635 may split within the blisk to individually connect to the inlet port 652 at the pressure side and the suction side, when employed. In this configuration, the intermediate portion 635A would be omitted.

Figure 8:
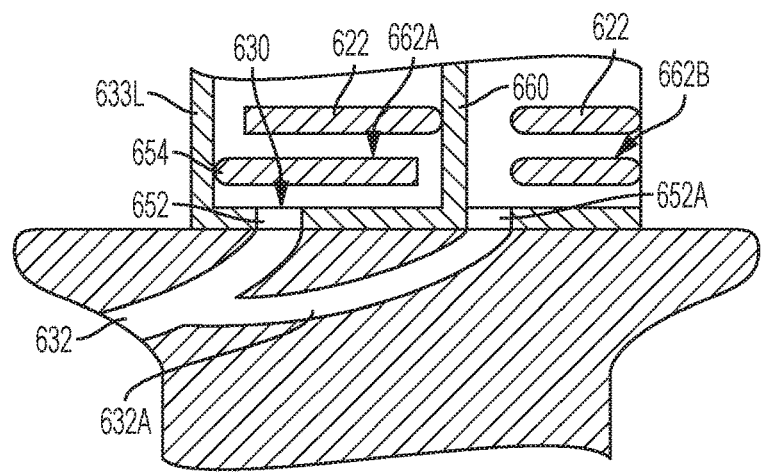
FIG. 8 is a sectional view along the airfoil axis of an example of a partial blisk with a branched cooling feed channel.

FIG. 8 depicts another example of the blisk 600 with the cooling feed channel 632 as the first branch and the blisk having a branch channel 632A as the second branch to feed cooling air to a trailing portion of the spar. Here, the base standoff 651 includes a pair of gaps to define a pair of inlet ports 652, 652A for entry to the cooling flow passages 630. The second inlet port 652A is shown disposed closer to the trailing edge 612D than the first inlet port 652. An intermediate radial separator wall 660 may be formed along the pressure side (as shown) and/or the suction side of the spar between the tip and the base and extended out away from the spar outer surface 616A by the same distance at the standoffs to separate the cooling air between a body section 662A of grooves and a trailing edge section 662B of grooves. The relative size of the cooling flow passages, cooling feed channel and branch, the inlet ports may be suitable to provide desired cooling between the two different sections. The branch channel 632A is shown extended from a body section of the cooling feed channel 632. The upstream end 663 of the branch channel 632A is in communication with the body of the cooling feed channel 632. The downstream end 665 of the branch channel 632A may be associated with and in fluid communication with the second inlet port 652A.

Figure 9:
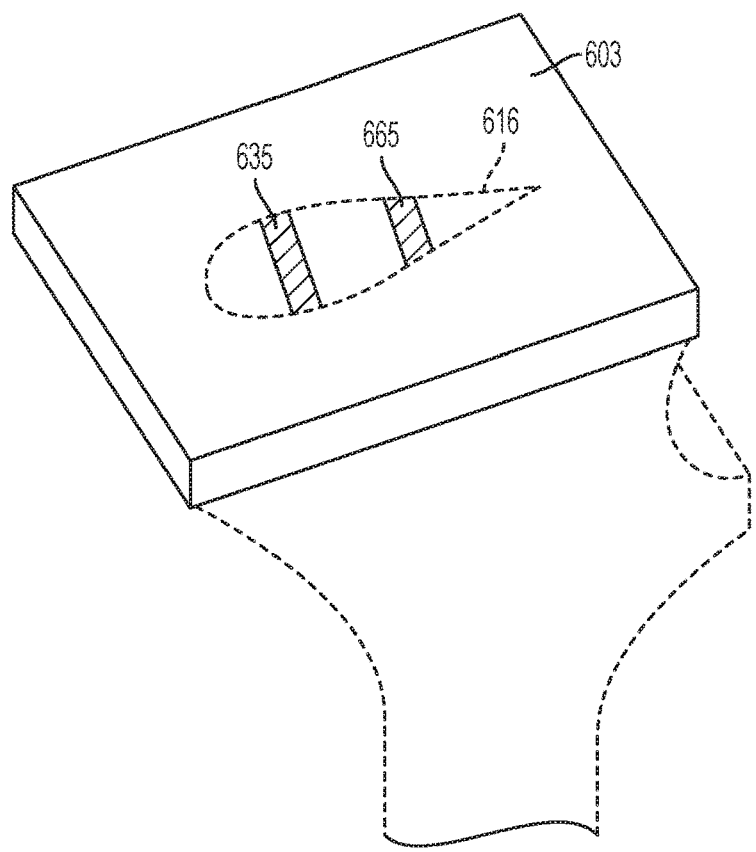
FIG. 9 depicts a relative location of a downstream end of a cooling feed channels formed in the blisk in FIG. 8.

FIG. 9 depicts the downstream end 635 of the cooling feed channel 632 and the downstream end 665 of the branch channel 632A relative to the spar 616 (shown in dashed lines) and the platform 603. The downstream ends 635, 665 may be sized to span the width of the spar from the suction side to the pressure side. The downstream ends 635, 665 are shown separated from one another. The ends of the downstream end 635, 665 may communicate cooling air to the cooling air passages 630 via the inlet ports 652, 652A. The intermediate portion of the downstream ends 635, 665 may provide cooling against the base of the spar. Each of the intermediate portions of the downstream ends may be further configured cool a larger area of the spar base. One or both of the downstream ends may be split to individually communicate to the corresponding inlet ports. Further, the downstream ends may have a connecting channel disposed between for communication between both of the downstream ends.

In one example, the disclosed blisks and blisk components described herein may be formed of a heat resistant superalloy composition, a ceramic material, such as a ceramic-matrix composite (CMC) material, or other materials used for components. There are various types of superalloy compositions, such as but not limited to nickel based or cobalt based compositions, and the manufacturers of such compositions are generally known to those skilled in the art. Most superalloy compositions of interest are complicated mixtures of nickel, chromium, aluminum and other select elements. The disclosed blisks may be of a unitary cast configuration, and/or an assembly of cast components, and/ or an assembly of cast and wrought components. The disclosed blisks may have an equiax, directionally solidified or a single crystal alloy structure. In one example, the blisk may be casted of single crystal single structure unit. Further, in alternate examples of the present invention the products may be formed of a metallic material, or an intermetallic material or a ceramic material. As mentioned above, the materials used for these blisk components need not be the same. For example, the annular blade segment may be cast from a nickel alloy, such as, for example, MAR-M-002 or MAR-M-234, while a nickel alloy powder known as UDI-MET 720 may be used to form the disk.

The cooling feed channels, passages, outlet and inlet ports may be formed from the use of ceramic inserts used during casting. In casting the blades, the internal cooling passages may be created by the use of ceramic cores (not shown) which may be subsequently leached out leaving the internal passages. In one example, the airfoil wall and the spar of the airfoil of the blade may be integrally formed as a unitary component through a casting or additive manufacturing, such as a three-dimensional (3-D) printing process, for example. In another example, the spar may be formed through a casting process to form standoffs in the desired pattern of pedestals, elongate columns, and/or pins that line the boundaries of grooves or channels. In another example, the spar may be machined via mechanical milling or pulse electrochemical machining (ECM) to form the standoffs in the desired pattern of pedestals, elongate columns, and/or pins and the grooves or channels. The spar after processing may be configured to receive a cover panel. In another example, a spar and a cover panel that may be placed over the spar may be integrally formed with one another, with standoffs walls and the grooves or channels formed between the spar and the cover panel.

In one example, a method of manufacturing the disclosed blisks including one or more of the following steps or any combination thereof with an investment casting process. The casted cooled blisk unit may include cooled airfoils of blisk blades cast integrally with the disk. The airfoil cooling circuit formed by the internal cooling flow passages, including the grooves and/or cooling passages, may be formed by placing ceramic elements into a rotor wax pattern before being shelled and casted.

For example, ceramic elements including one or more sacrificial ceramic cores having any of the features described herein is provided. The ceramic elements may be shaped to correspond with the desired pattern of internal cooling flow passages. The ceramic elements may be inserted into a casting mold. Particularly, the ceramic elements defined at least in part by the one or more sacrificial ceramic core may be positioned within two joined halves of a metal casting mold. The casting mold defines an injection volume that corresponds to the desired shape of the airfoil of the blade of the blisk. Other ceramic structures may be used to define the cooling feed channels within the shank portions and/or disks and coupled to the ceramic core for defining a non-obstructed cooling air passage into the airfoil.

Melted wax may be vacuum injected into a wax mold around the ceramic structure. After the wax hardens, the wax mold halves are separated and removed to reveal the ceramic structure encased inside a wax pattern that corresponds to the shape of the airfoil of the blade of the blisk. The wax pattern's outer surface may be then coated with a ceramic material, such as, for example, by a dipping process, to form the ceramic shell around the ceramic structure and wax pattern unit. A component material in the form of a molten metal alloy may be introduced into the casting mold. Particularly, upon curing of the ceramic shell and removal of the wax such as by an oven, a completed ceramic casting mold may be available to receive molten alloy in the investment casting process. Molten metal alloy material may be then cast into the ceramic casing mold. The ceramic structure including the one or more sacrificial ceramic cores may be removed after the component material has solidified. Particularly, after the molten metal alloy has solidified, the ceramic structure, including the sacrificial ceramic cores may be removed by mechanical and/or chemical means to reveal the component as a final cast alloy.

The final cast alloy may be close to final form or finished shape, either as the full blisk having the spar ready for bonding to the cover panel or the annular blade segment for attachment to the disk to form the full blisk having the spar that is ready for bonding to the cover panel. The final cast alloy may then be machined, such as by drilling, laser cutting, wire EDM (electric discharge machining), grinding and/or polishing. For example, the cooling cavities, if employed, may be formed by the removal of the corresponding sections. The final shape of the platform and/or the seal support may be formed. The seal element, such as the knife edge seals, may be machined into the upstream section of the platforms. The slots may be machined into the platforms, as shown, to define a discontinuous platform. One or more outlet ports may be machined with, for example, by drilling or laser cutting, in the final cast alloy component such that the machined ports in the airfoil are in fluid communication with the internal cooling flow passages.

Alternatively, the disclosed blisks or substantial aspects of the blisks may be manufactured using conventional techniques generally referred to as additive manufacturing or additive fabrication. Known additive manufacturing/fabrication processes include techniques such as, for example, 3-D printing, which is a process where material is deposited successively in layers under the control of a programmable computer to form the 3-D structure unit. Additive fabrication equipment, such as a 3-D printer, is commanded by the computer to deposit the successive layers in accordance with a computer-readable 3-D model (for example, an AMF or STL digital file). The 3-D software model configured to be converted into a plurality of substantially two-dimensional (2-D) slices. The 2-D slices define a cross-sectional layer of at least one of the disk, shank, platform, spar, and cover panel of the blisk in order depending on the layer to manufacture, or fabricate, one of the disclosed blisk/blisk component configurations described above. In other words, certain 2-D layers depending on the elevation may include aspects of the disk and not the spar, for example, and other layers may include aspects of the spar and not the platform, for example, as may be appreciated by those of ordinary skill in the art. In one example, the 3-D printing process may be utilized to manufacture the blisk, including the spar extending away from the disk, the platform, and the shank, with the cover panel integrated with the spar. For instance, certain 2-D layers may include aspects of a combination of the spar and the cover panel, as may be appreciated by those of ordinary skill in the art. In one example, the 3-D printing process may be utilized to manufacture the blisk, including the spar with the platform and shank extending away from the disk, which will be subsequently coupled to the cover panel. In one example, the disk may be formed by casting, forging, or 3-D printing, and the 3-D printing process may be utilized to manufacture the spar, the platform, and the shank portion, and the other disclosed features, directly on the previously formed disk to form one of the disclosed blisks.

In one example, a 3-D model used to represent one of the disclosed blisk/blisk component configurations described above may be on a computer-readable storage medium such as, for example, magnetic storage including floppy disk, hard disk, or magnetic tape; semiconductor storage such as solid state disk (SSD) or flash memory; optical disc storage; magneto-optical disc storage; or any other type of physical memory on which information or data readable by at least one processor may be stored. The storage medium may be used in connection with commercially available 3-D printers to manufacture, or fabricate, one of the blisk/blisk component configurations described above. Alternatively, the 3-D model may be transmitted electronically to the 3-D printer in a streaming fashion without being permanently stored at the location of the 3-D printer. In either case, the 3-D model constitutes a digital representation of one of the blisk/blisk component configurations described above suitable for use in manufacturing aspects of the blisks.

The 3-D model may be generated by various means. In general, the 3-D model may be created by inputting data representing one of blisk/blisk component configurations described above to a computer or a processor such as a cloud-based software operating system. In an example, the 3-D model may be suitable for the purpose of manufacturing one of blisk/blisk component configurations described above by an additive manufacturing technique. The additive manufacturing process utilized to create one of blisk/blisk component configurations described above may include one of the materials reference above. The additive manufacturing process may form a finished product, or additional processes may be performed to create the finished product. Such additional processes may include, for example, one or more of cleaning, hardening, heat treatment, material removal, and polishing, and other machining processes disclosed herein. The additive manufacturing process may be used to form individual units (spars, spar/cover panel units, airfoil units, blade units) and/or annular segments of multiple units. These formed units may be permanently joined, for example by brazing, diffusion bonding, inertia or friction welding, to the disk.

The cover panel(s) may be metallurgically bonded to the outer surfaces of the standoffs. To prepare the as-cast bond outer surface or the additive manufactured outer surface of the standoffs for such cover panel bonding, that is, to prepare a smooth and continuous surface, material may be removed from the as-cast outer surface or additive manufactured outer surface. The material, for example about 0.001 to 0.002 inches of material, may be removed by any suitable means, for example, by high-speed milling or a similar process. The bonding process may utilize the CastBond™ process for Ni alloys, a suitable process for Ti alloys, which may include the use of Ti braze filler material such as Taconic. A shaft bore may be formed or further machined into the center of the disk of any one of the disclosed blisks. The shaft bore may be configured to receive an engine shaft component.

Cooling air used for cooling turbine components may be supplied from any suitable source. For example, the cooling air may be bled internally from one or more of the compressors, such as, for example, an intermediate pressure compressor and/or a high pressure compressor of the compressor portion. Cooling air comes from fluid passages from the compressor portion, around the combustion portion and into the turbine portion. The platforms may form a shield to protect the disk from the temperature of the main gas path and directing the hot gas downstream for exhaust, and to prevent leakage of cooling air into the hot gas path.

As described above, one of the disclosed blisks is configured to allow cooling air to enter the internal cooling flow passages within the blades, such as the cooling air passages defined between the spar and the cover panel. To reach these locations, the cooling air is fed through the cooling feed channels defined in the blade shank portions or disks, which are located under the platforms. Before entering the cooling feed channels, the cooling air path may be arranged to draw the air across the first face of the disk of the blisk thereby cooling the disk portion of the blisk. At least a portion of the cooling air may be directed to the cooling air passages along the outer surface of the spar to provide cooling, for example, effusion cooling. The cooling air passing into the cooling air passages experiences a centripetal acceleration due to the rotation of the blisk. In turn, the cooling air moves through the cooling feed channels in the radially outward direction to the inlet ports formed in the spar base standoff. Cooling of the spar and panel occurs as the cooling air moves through the pattern of standoffs forming the cooling flow surface passages. Cooling air may exit the cooling passages through discharge or outlet ports in the cover panel and along the outside surface of the airfoil for film cooling. The film outlet ports or slot may be configured to reduce the aerodynamic penalty and further reduce surface temperatures. Embedding the channels below the airfoil surface allows for higher cooling effectiveness. Cooling air enters the cooling channel and flows along the smooth surface.

Improvement in temperature limitations of the blisk and blades with cooling features may allow less cooling air flow from compressor to be used. Less air flow may result in such saved air being used in the combustor, therefore promoting the capture of better fuel economy for the gas turbine engine. Improvements in temperature limitations of the blisk assembly and blade section may allow the turbine gas engines to operate hotter and with additional power. The blisk assembly configurations may provide an inexpensive option and/or reduced weight for a turbine section.

In some instances, the term "disk" may be defined generally as referring to any structure extending from the inner edge of the disk to the platform. In this regard, the term "disk" may encompass the structure defined as the shank portion, which, in some examples, may be preferred when the structure is casted and difficult to distinguish the components.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

Furthermore, the advantages described above are not necessarily the only advantages, and it is not necessarily expected that all of the described advantages will be achieved with every embodiment.

The subject-matter of the disclosure may also relate, among others, to the following aspects:

1. A blisk for a gas turbine engine having a longitudinal axis, the blisk comprising a disk, a spar, a platform, and a shank portion integrally formed as a unit, the disk disposed about a longitudinal axis and having an upstream side and a downstream side, the spar extending radially outward from the platform relative to the longitudinal axis, the shank portion extending between the platform and the disk, wherein the spar includes a plurality of standoffs extending away from an outer surface of the spar, wherein the blisk further comprises a cover panel bonded to an outer surface of the standoffs, wherein the standoffs are spaced from one another such that a plurality of cooling flow passages are defined between the cover panel and the spar, the spar including a base standoff disposed along the platform, the base standoff comprising an inlet port defined in the base standoff in communication with the cooling flow passages, the cover panel having one or more discharge ports defined therein in communication with the cooling flow passages, wherein a cooling feed channel is defined in the disk or shank portion and in communication with the inlet port, wherein the cooling feed channel is configured to receive cooling air upstream of the disk for delivery to the cooling flow passages.

2. The blisk of aspect 1, wherein the spar includes a suction side and a pressure side, wherein the base standoff is located along at least one of the pressure side and the suction side.

3. The blisk of aspect 2, wherein the inlet port is a first inlet port associated with the pressure side, the spar comprising a second inlet port defined in a second base standoff located along the suction side.

4. The blisk of any one of the aspects 1-3, wherein a downstream end of the cooling feed channel spans a width of the spar to communicate with the first and second inlet ports.

5. The blisk of any one of the aspects 1-4, wherein the inlet port is a first inlet port, the spar including a second inlet port defined in the base standoff, wherein the second inlet port is disposed closer to a trailing edge of the spar than the first inlet port.

6. The blisk of aspect 5, wherein the cooling feed channel includes a first branch in communication with the first inlet port and a second branch in communication with the second inlet port.

7. The blisk of aspect 6, wherein the spar includes a radial separator wall to divide the spar between a body section and a trailing section, wherein the first inlet port is associated with the body section and the second inlet port is associated with the trailing section.

8. The blisk of any one of aspects 1-7, further comprising an upstream rim, wherein the cooling feed channel extends through the upstream rim.

9. The blisk of any one of aspects 1-8, wherein the disk, the spar, the platform, and the shank portion are a casted unit.

10. The blisk of any one of aspects 1-9, wherein the spar, the platform, and the shank portion are a successively layered formed unit.

11. The blisk of any one of aspects 1-10, wherein the cooling feed channel includes an inlet formed in the upstream side of the disk or the shank portion.

12. The blisk of any one of aspects 1-11, wherein the cover panel comprises a single sheet.

13. The blisk of any one of aspects 1-12, wherein the cover panel comprises a suction side panel and a pressure side panel.

14. A method of making a blisk for a gas turbine engine, the method comprising: forming a disk, a spar, a platform, and a shank portion integrally as a unit, wherein the spar extends radially outward from the platform, the shank portion extends between the platform and the disk, wherein the spar includes a plurality of standoffs extending away from an outer surface of the spar, the standoffs spaced away from one another such that cooling passages are defined therebetween, and an inlet port defined in a base standoff in communication with the cooling passages, wherein a cooling feed channel is defined in the disk or shank portion and in communication with the cooling air passages; and coupling a cover panel to an outer surface of the standoffs.

15. The method of aspect 14, wherein the unit formed is formed as a casted unit.

16. The method of aspect 14, wherein the forming includes: forming the disk; providing a computer-readable three-dimensional model of the spar, the platform, and the shank portion, the three-dimensional model configured to be converted into a plurality of slices that each define a cross-sectional layer of at least one of the spar, the platform, and the shank portion; and successively forming each layer of at least one of the spar, the platform, and the shank portion directly on the disk by additive manufacturing.

17. The method of aspect 14, wherein the forming step and the coupling step include forming the disk; providing a computer-readable three-dimensional model of the spar, the platform, the shank portion, and the cover panel, the three-dimensional model configured to be converted into a plurality of slices that each define a cross-sectional layer of at least one of the spar, the platform, the shank portion, and the cover panel; and successively forming each layer of at least one of the spar, the platform, the shank portion, and the cover panel directly on the disk by additive manufacturing. The methods of aspects 14-17 may be employed to make any one of the blisks of aspects 1-13.

18. A gas turbine engine having longitudinal axis, the gas turbine engine comprising a turbine section including a blisk, the blisk including a disk, a spar, a platform, and a shank portion integrally formed as a unit, the disk disposed about a longitudinal axis and having an upstream side and a downstream side, the spar extending radially outward from the platform relative to the longitudinal axis, the shank portion extending between the platform and the disk, wherein the spar includes a plurality of standoffs extending away from an outer surface of the spar, wherein the blisk further comprises a cover panel bonded to an outer surface of the standoffs, wherein the standoffs are spaced from one another such that a plurality of cooling flow passages are defined between the cover panel and the spar, the spar comprising an inlet port defined in a base standoff in communication with the cooling flow passages, the cover panel having one or more discharge ports defined therein in communication with the cooling flow passages, wherein a cooling feed channel is defined in the disk or shank portion and in communication with the inlet port, wherein the cooling feed channel is configured to receive cooling air upstream of the disk for delivery to the cooling flow passages.

19. The gas turbine engine of aspect 18, wherein the disk, the spar, the platform, and the shank portion are a casted unit.

20. The gas turbine engine of aspect 18, wherein the spar, the platform, and the shank portion are a successively layered formed unit. The gas turbine engine of aspect 18 may include any one of the blisks configured in aspects 1-13.

What is claimed is:

1. A blisk for a gas turbine engine having a longitudinal axis, the blisk comprising a disk, a spar, a platform, and a shank portion integrally formed as a unit, the disk disposed about the longitudinal axis and having an upstream side and a downstream side, the spar extending radially outward from the platform relative to the longitudinal axis, the shank portion extending between the platform and the disk, wherein the spar includes a plurality of standoffs extending away from an outer surface of the spar, wherein the blisk further comprises a cover panel bonded to an outer surface of the standoffs, wherein the standoffs are spaced from one another such that a plurality of cooling flow passages are defined between the cover panel and the spar, the spar including a base standoff disposed along the platform, the base standoff comprising an inlet port defined in the base standoff in communication with the cooling flow passages, the cover panel having one or more discharge ports defined therein in communication with the cooling flow passages, wherein a cooling feed channel is defined in the disk or shank portion and in communication with the inlet port, wherein the cooling feed channel is configured to receive cooling air upstream of the disk for delivery to the cooling flow passages.

2. The blisk of claim 1, wherein the spar, the platform, and the shank portion are a successively layered formed unit.

3. The blisk of claim 1, wherein the cooling feed channel includes an inlet formed in the upstream side of the disk or the shank portion.

4. The blisk of claim 1, wherein a downstream end of the cooling feed channel spans a width of the spar to communicate with the first and second inlet ports.

5. The blisk of claim 1, wherein the cover panel comprises a single sheet.

6. The blisk of claim 1, wherein the cover panel comprises a suction side panel and a pressure side panel.

7. The blisk of claim 1, wherein the disk, the spar, the platform, and the shank portion are a casted unit.

8. The blisk of claim 1 further comprising an upstream rim, wherein the cooling feed channel extends through the upstream rim.

9. The blisk of claim 1, wherein the spar includes a suction side and a pressure side, wherein the base standoff is located along at least one of the pressure side and the suction side.

10. The blisk of claim 9, wherein the inlet port is a first inlet port associated with the pressure side, the spar comprising a second inlet port defined in a second base standoff located along the suction side.

11. The blisk of claim 1, wherein the inlet port is a first inlet port, the spar including a second inlet port defined in the base standoff, wherein the second inlet port is disposed closer to a trailing edge of the spar than the first inlet port.

12. The blisk of claim 11, wherein the cooling feed channel includes a first branch in communication with the first inlet port and a second branch in communication with the second inlet port.

13. The blisk of claim 12, wherein the spar includes a radial separator wall to divide the spar between a body section and a trailing section, wherein the first inlet port is associated with the body section and the second inlet port is associated with the trailing section.

14. A gas turbine engine having longitudinal axis, the gas turbine engine comprising a turbine section including a blisk, the blisk including a disk, a spar, a platform, and a shank portion integrally formed as a unit, the disk disposed about the longitudinal axis and having an upstream side and a downstream side, the spar extending radially outward from the platform relative to the longitudinal axis, the shank portion extending between the platform and the disk, wherein the spar includes a plurality of standoffs extending away from an outer surface of the spar, wherein the blisk further comprises a cover panel bonded to an outer surface of the standoffs, wherein the standoffs are spaced from one another such that a plurality of cooling flow passages are defined between the cover panel and the spar, the spar comprising an inlet port defined in a base standoff in communication with the cooling flow passages, the cover panel having one or more discharge ports defined therein in communication with the cooling flow passages, wherein a cooling feed channel is defined in the disk or shank portion and in communication with the inlet port, wherein the cooling feed channel is configured to receive cooling air upstream of the disk for delivery to the cooling flow passages.

15. The gas turbine engine of claim 14, wherein the disk, the spar, the platform, and the shank portion are a casted unit.

16. The gas turbine engine of claim 14, wherein the spar, the platform, and the shank portion are a successively layered formed unit.

\* \* \* \* \*